(12) United States Patent
Kawamoto et al.

(10) Patent No.: US 6,472,339 B2
(45) Date of Patent: *Oct. 29, 2002

(54) BARIUM TITANATE SEMICONDUCTIVE CERAMIC

(75) Inventors: Mitsutoshi Kawamoto, Hirakata (JP); Hideaki Niimi, Hikone (JP); Ryouichi Urahara, Yokaichi (JP); Yukio Sakabe, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/157,062

(22) Filed: Sep. 18, 1998

(65) Prior Publication Data

US 2001/0008866 A1 Jul. 19, 2001

(30) Foreign Application Priority Data

Oct. 9, 1997 (JP) .............................. 9-276740

(51) Int. Cl.$^7$ ............................. C04B 35/468
(52) U.S. Cl. ...................... 501/137; 501/139
(58) Field of Search ................ 501/136, 137, 501/138, 139

(56) References Cited

U.S. PATENT DOCUMENTS

| | | | |
|---|---|---|---|
| 3,764,529 A | * 10/1973 | Matsuo et al. | 501/139 |
| 4,535,064 A | * 8/1985 | Yoneda | 501/139 |
| 4,832,939 A | 5/1989 | Menashi et al. | |
| 5,065,274 A | * 11/1991 | Berghout et al. | 501/137 |
| 5,219,811 A | * 6/1993 | Enomoto et al. | 501/138 |
| 5,314,651 A | * 5/1994 | Kulwicki | 501/139 |
| 5,453,262 A | 9/1995 | Dawson et al. | |
| 5,510,305 A | * 4/1996 | Sano et al. | 501/138 |
| 5,734,545 A | * 3/1998 | Sano et al. | 361/321.4 |
| 6,162,752 A | * 12/2000 | Kawamoto et al. | 501/137 |
| 6,376,079 B1 | * 4/2002 | Kawamoto et al. | 501/136 |

FOREIGN PATENT DOCUMENTS

| | | |
|---|---|---|
| EP | 0641740 A1 | 8/1994 |
| GB | 2308360 A | 6/1997 |

OTHER PUBLICATIONS

Sasaki et al "Influence of Antimony doping on electrical properties of barium Titanate Thin Films" Mater. Lett. (1996) CA 125:46514. No month.*

Database WPIL Questel, week (1991–47), London; Derwent Publications Ltd., AN 1990–075810, US 987 H1 (Buchanan), Abstract.

"Effect of Green States on Sintering Behavior and Microstructural Evolution of High–Purity Barium Titanate"; Huey–Lin Hsieh, et al.; *J. Am. Ceram. Soc.*, 73[6] 1566–73 (1990).

"Initial Specific Surface Area and Grain Growth in Donor–Doped Barium Titanate"; Miha Drofenik; *J. Am. Ceram, Soc.*, 73[6] 1587–92 (1990).

"Preparation of Barium Titanate Films at 55° C by an Electrochemical Method"; Priya Bendale, et al.; *J. Am. Ceram. Soc.*, 76[10] 2619–27 (1993).

* cited by examiner

*Primary Examiner*—Karl Group
(74) *Attorney, Agent, or Firm*—Ostrolenk, Faber, Gerb & Soffen, LLP

(57) ABSTRACT

The present invention provides barium titanate semiconductive ceramic having low specific resistance at room temperature and high withstand voltage, which fully satisfies the demand for enhancing withstand voltage. The average ceramic grain size of the barium titanate semiconductive ceramic is controlled to about 0.9 $\mu$m or less. By this control, the ceramic possesses low specific resistance at room temperature and high withstand voltage fully satisfying a recent demand for enhancing withstand voltage and may suitably used for applications such as controlling temperature and limiting current, or in exothermic devices for constant temperature. Accordingly, the barium titanate semiconductive ceramic enables an apparatus using the same to have enhanced performance and reduced size.

15 Claims, No Drawings

BARIUM TITANATE SEMICONDUCTIVE CERAMIC

BACKGROUND OF THE INVENTION

1. Field of the Invention

The present invention relates to a barium titanate semiconductive ceramic which has positive resistance-temperature characteristics and is suitable for applications such as controlling temperature and limiting current, or exothermic devices for constant temperature.

2. Background Art

A barium titanate semiconductive ceramic has positive resistance-temperature characteristics (PTC characteristics). It has low specific resistance at room temperature and its electric resistance suddenly rises when a particular temperature (the Curie temperature) is surpassed. Thus, the ceramic is widely used in a broad range of applications such as controlling temperature and limiting current, or in exothermic devices for constant temperature.

These applications require that titanate semiconductive ceramic have not only PTC characteristics, but also sufficiently withstand voltage to permit use under high voltage. Therefore, there is need for a semiconductive ceramic having PTC as well as high withstand voltage characteristics. Particularly, overcurrent-protection devices for circuits demand that higher withstand voltage be realized.

To this end, a variety of proposals have hitherto been made in order to enhance withstand voltage of barium titanate semiconductive ceramics. For example, Japanese Patent Application Laid-Open (kokai) No. 4-26101 discloses a ceramic having a ceramic grain size of 6–15 $\mu$m, low specific resistance at room temperature and high withstand voltage obtained by adding Dy and Sb to a semiconductive ceramic comprising $BaTiO_3$ and $SrTiO_3$ incorporated with $TiO_2$, $SiO_2$, $Al_2O_3$, and $MnO_2$. Japanese Patent Publication (kokoku) No. 60-25004 discloses that when a powder which is obtained by crushing, mixing and calcining a barium-titanium compounded oxalate and an Sb oxide (serving as a semiconducting agent) is fired at 1350° C. while the calcining conditions and compacting pressure are controlled, there is obtained ceramic having a ceramic grain size of 1–5 $\mu$m and high withstand voltage.

However, the semiconductive ceramic described in Japanese Patent Application Laid-Open (kokai) No. 4-26101 has a specific resistance of about 50 $\Omega$cm and a withstand voltage of about 200 V/mm and such withstand voltage is still unsatisfactory. Also, the semiconductor material described in Japanese Patent Publication (kokoku) No. 60-25004 has a maximum withstand voltage of about 500 V/mm, which does not fully meet the current demand for enhancing withstand voltage.

Therefore, an object of the present invention is to provide barium titanate semiconductive ceramic having low specific resistance at room temperature and high withstand voltage, which fully meets the current demand for enhancing withstand voltage.

SUMMARY OF THE INVENTION

The present inventors have conducted earnest studies to attain the above object, and have found that a barium titanate semiconductive ceramic having an average ceramic grain size smaller than a certain value has low specific resistance at room temperature and excellent withstand voltage. The present invention was accomplished based on this finding.

Accordingly, the present invention provides a barium titanate semiconductive ceramic having an average ceramic grain size of about 0.9 $\mu$m or less.

The barium titanate semiconductive ceramic of the present invention is preferably obtained from a barium titanate powder or a calcined barium titanate powder having strictly limited physical properties, i.e., a grain size of about 0.1 $\mu$m or less, a cubic system crystal structure and a lattice constant of 4.02 angstroms or more, and containing a micro-quantity of a semiconducting agent in the form of solid solution.

DETAILED DESCRIPTION OF THE INVENTION AND PREFERRED EMBODIMENTS

The barium titanate semiconductive ceramic of the present invention has an average ceramic grain size of about 0.9 $\mu$m or less. The average grain size may be obtained by observing the surface of the ceramic by use of, for example, an SEM (scanning electron microscope).

In manufacture of the barium titanate semiconductive ceramic of the present invention, the generally known methods may be used so long as they provide an average ceramic grain size of about 0.9 $\mu$m or less. For example, a sequential process of granulating the raw material powder with a binder, shaping, and firing may be performed.

Preferably, the raw material powder is a barium titanate powder or a calcined barium titanate powder having strictly limited physical properties, i.e., a grain size of about 0.1 $\mu$m or less, a cubic system crystal structure and a lattice constant of 4.02 angstroms or more, and containing a micro-quantity of a semiconducting agent in the form of solid solution. When such powder is used as a raw material, barium titanate semiconductive ceramic having high withstand voltage is obtained.

No particular limitation is imposed on the methods for manufacturing the barium titanate powder so long as the ceramic having the above-described physical properties can be obtained. Examples include the hydrolysis method, sol-gel method, hydrothermal method, coprecipitation method, and solid phase method. Of these, the hydrolysis method is preferred. In order to obtain the barium titanate powder through the hydrolysis method, the following steps may be performed: preparing a solution containing a salt or an alkoxide of barium and a solution containing a salt or an alkoxide of titanium; mixing the solutions at a ratio where the desirable stoichiometry of barium and titanium is realized and causing reaction to form a slurry; aging the slurry; dehydrating; washing with water; drying; and crushing.

During manufacture, a micro-quantity of a semiconducting agent is incorporated into the barium titanate powder to be obtained, so as to form a solid solution. The term "micro-quantity" means an amount sufficient to provide semiconductive properties without significantly otherwise affecting the characteristics of the titanate. This amount is frequently less than about 0.5 m % based on Ti. Examples of the semiconducting agent which may be used include rare earth metal elements such as La, Y, Sm, Ce, Dy, or Ga; and transition elements such as Nb, Ta, Bi, Sb, or W. Of these, La is preferably used. A solid solution of a semiconducting agent with a barium titanate powder is formed by, for example, adding a solution containing a salt of the semiconducting agent to either of the barium-containing solution or titanium-containing solution in advance and making a powder with the barium component and the titanium component.

The thus-obtained barium titanate powder may be used as is as a raw material powder or calcined to provide the raw material powder. The calcination is performed, for example, at about 800 to about 1000° C. for about 1 to about 3 hours with optional pre-heating.

The resultant barium titanate raw material powder is then granulated by use of a known binder such as vinyl acetate. The obtained granulated powder is shaped through a known method such as uniaxial pressing to form a compact, which is fired to thereby obtain the barium titanate semiconductive ceramic of the present invention. The compact is fired under the conditions, e.g., of about 1200 to about 1300° C. for about 1 to about 3 hours in air.

The barium titanate semiconductive ceramic having an average ceramic grain size of about 0.9 μm or less which may be manufactured through the above method has low specific resistance at room temperature and high withstand voltage fully satisfying the demand for enhancing withstand voltage and is suitable for applications such as controlling temperature and limiting current, or for use in exothermic devices for constant temperature. The barium titanate semiconductive ceramic enables an apparatus using the same to have enhanced performance and reduced size.

EXAMPLES

The present invention will next be described more specifically by way of examples.

Example 1

A 0.2 mol/l aqueous solution of barium hydroxide (15.40 l; containing 3.079 mol barium) and a 0.35 mol/l solution of a titanium alkoxide (7.58 l; containing 2.655 mol titanium) were individually prepared in separate tanks. The solution of a titanium alkoxide was formed by dissolving $Ti(O-iPr)_4$ (titanium tetraisopropoxide) in IPA (isopropyl alcohol). During the preparation process, an ethanol solution of lanthanum chloride ($LaCl_3 \cdot 6.3H_2O$) (100 ml, containing 0.00664 mol lanthanum) was added to the solution of the titanium alkoxide and the mixture was homogenized in order to form a solid solution containing lanthanum serving as a semiconducting agent.

Subsequently, each of the solutions was pumped from its respective tank by use of a gear pump for feeding liquid, and the solutions were mixed by use of a static mixer to cause a reaction to occur. The resultant slurry was introduced to a tank for aging, and was circulated through the static mixer to thereby allow the slurry to age for three hours.

After aging, the slurry was dehydrated by use of a centrifugal separator and the resultant cake was washed by stirring in hot water at 80–90° C. for 15 minutes by use of a homogenization mixer. Subsequently, the slurry was dehydrated by use of a centrifugal machine and the resultant cake was further washed by stirring in ethanol for 30 minutes by use of a homogenization mixer. The washed slurry was dehydrated again by use of a centrifugal separator, and the resultant cake was dried in an oven at 110° C. for three hours. After drying, the cake was crushed to obtain a powder of a La-containing barium titanate solid solution. The powder has a grain size of 0.05 μm and a lattice constant of the cubic crystal of 4.032 angstroms, as confirmed through SEM and powder X-ray diffraction, respectively. The Ba/Ti and La/Ti ratios were 0.991 and 0.0021, respectively, according to fluorescent X-ray analysis.

The thus-obtained powder of a La-containing barium titanate solid solution was calcined at 1000° C. for two hours. The thus-obtained calcined powder was mixed with a binder such as vinyl acetate, to thereby manufacture a granulated powder, which was subjected to uniaxial pressing to form a disk-like compact having a diameter of 10 mm and a thickness of 1 mm. The compact was fired at 1250° C. for two hours in air, to thereby obtain a barium titanate semiconductive ceramic piece.

The ceramic grain size, specific resistance at room temperature, and withstand voltage of the obtained barium titanate semiconductive ceramic piece were obtained. With regard to the ceramic grain size, there was determined an average ceramic grain size obtained by taking an SEM photograph of the surface of the ceramic piece and calculating based on image analysis of the photograph. With regard to the specific resistance at room temperature, there was determined a value of the surface of the ceramic piece coated with In—Ga that was measured through a four-probe method by use of a digital electronic voltage meter at 25° C. With regard to the withstand voltage, there was determined a value obtained by measuring a maximum applied voltage immediately before the breakage of the sample and dividing the measured voltage by the interelectrode distance of the sample. The results show that the ceramic piece has a ceramic grain size of 0.9 μm, a specific resistance at room temperature of 50 Ωcm and a withstand voltage of 900 V/mm.

Example 2

The procedure of Example 1 was performed, except that an ethanol solution of lanthanum chloride containing 0.00531 mol lanthanum was used, to thereby obtain a powder of a La-containing barium titanate solid solution. The obtained powder of a La-containing barium titanate solid solution has a grain size of 0.05 μm, a lattice constant of the cubic crystal of 4.029 angstroms, and Ba/Ti and La/Ti ratios of 0.998 and 0.0018, respectively.

The procedure of Example 1 was performed by use of the powder—without calcination—as a raw powder, to thereby obtain a barium titanate semiconductive ceramic piece.

The obtained barium titanate semiconductive ceramic piece has a ceramic grain size of 0.8 μm, a specific resistance at room temperature of 78 Ωcm and a withstand voltage of 1250 V/mm.

Example 3

The procedure of Example 2 was performed, except that the powder of a La-containing barium titanate solid solution obtained in Example 2 was calcined at 800° C. for two hours to serve as a raw powder, to thereby obtain a barium titanate semiconductive ceramic piece.

The obtained barium titanate semiconductive ceramic piece has a ceramic grain size of 0.9 μm, a specific resistance at room temperature of 60 Ωcm and a withstand voltage of 1120 V/mm.

Example 4

The procedure of Example 1 was performed, except that an ethanol solution of lanthanum chloride containing 0.00398 mol lanthanum was used, to thereby obtain a powder of La-containing barium titanate solid solution. The obtained powder of a La-containing barium titanate solid solution has a grain size of 0.05 μm, a lattice constant of the cubic crystal of 4.027 angstroms, and Ba/Ti and La/Ti ratios of 0.996 and 0.0013, respectively.

The procedure of Example 1 was performed by calcining the powder of a La-containing barium titanate solid solution under the same conditions as those of Example 1 to serve as a raw calcined powder, to thereby obtain a barium titanate semiconductive ceramic piece. The obtained barium titanate semiconductive ceramic piece has a ceramic grain size of 0.8 μm, a specific resistance at room temperature of 84 Ωcm and a withstand voltage of 1300 V/mm.

Example 5

The powder of a La-containing barium titanate solid solution obtained in Example 1 was heat-treated at 600° C. for two hours. The heat-treated powder has a grain size of 0.1 μm and a lattice constant of the cubic crystal of 4.020 angstroms. The procedure of Example 1 was performed by calcining the heat-treated powder under the same conditions as those of Example 1 to serve as a raw calcined powder, to thereby obtain a barium titanate semiconductive ceramic piece.

The obtained barium titanate semiconductive ceramic piece has a ceramic grain size of 0.9 μm, a specific resistance at room temperature of 40 Ωcm and a withstand voltage of 800 V/mm.

Example 6

The procedure of Example 1 was performed without adding an ethanol solution of lanthanum chloride ($LaCl_3 \cdot 3H_2O$) to the solution of the titanium alkoxide, to thereby obtain a powder of a La-free barium titanate non-solid solution. The obtained barium titanate powder has a grain size of 0.05 μm, a lattice constant of the cubic crystal of 4.028 angstroms, and a Ba/Ti ratio of 0.998.

To the barium titanate powder, La was then added in the form of a solution of lanthanum nitrate in an amount of 0.15 mol %, and the mixture was calcined at 1000° C. for two hours. The procedure of Example 1 was performed by use of the thus-obtained calcined powder as a raw powder, to thereby obtain a barium titanate semiconductive ceramic piece. The firing was performed at 1200° C. for two hours. The obtained barium titanate semiconductive ceramic piece has a ceramic grain size of 0.8 μm, a specific resistance at room temperature of 90 Ωcm, and a withstand voltage of 720 V/mm.

Comparative Example 1

The powder of a La-containing barium titanate solid solution obtained in Example 1 was heat-treated at 800° C. for two hours. The heat-treated powder has a grain size of 0.17 μm and a lattice constant of the cubic crystal of 4.005 angstroms. The procedure of Example 1 was performed by calcining the heat-treated powder under the same conditions as those of Example 1 to serve as a raw calcined powder, to thereby obtain a barium titanate semiconductive ceramic piece.

The obtained barium titanate semiconductive ceramic piece has a ceramic grain size of 1–3 μm, a specific resistance at room temperature of 30 Ωcm and a withstand voltage of 400 V/mm.

Comparative Example 2

The slurry containing titanium, barium, and lanthanum obtained in Example 1 was introduced into an agitated autoclave and allowed to hydrothermally react at 200° C. for eight hours. The procedure of Example 1 was performed to thereby obtain a powder of a La-containing barium titanate solid solution. The obtained powder of a La-containing barium titanate solid solution has a grain size of 0.1 μm, a lattice constant of the cubic crystal of 4.010 angstroms, and Ba/Ti and La/Ti ratios of 0.998 and 0.0020, respectively.

The procedure of Example 1 was performed by calcining the powder of a La-containing barium titanate solid solution under the same conditions as those of Example 1 to serve as a raw calcined powder, to thereby obtain a barium titanate semiconductive ceramic piece.

The obtained barium titanate semiconductive ceramic piece has a ceramic grain size of 1–20 μm, a specific resistance at room temperature of 40 Ωcm and a withstand voltage of 300 V/mm.

The results of the thus-described Examples and Comparative Examples are shown in Table 1.

TABLE 1

| | Physical properties of raw powders | | | | | Physical properties of Ba titanate semiconductive ceramic | | |
|---|---|---|---|---|---|---|---|---|
| | Grain size (μm) | Crystal system | Lattice const. (angstrom) | Ba/Ti ratio | La/Ti ratio | Av. ceramic grain size (μm) | Specific resistance at room temp. (Ωcm) | Withstand voltage (V/mm) |
| Example 1 | 0.05 | Cubic | 4.032 | 0.991 | 0.0021 | 0.9 | 50 | 900 |
| Example 2 | 0.05 | Cubic | 4.029 | 0.998 | 0.0018 | 0.8 | 78 | 1250 |
| Example 3 | 0.05 | Cubic | 4.032 | 0.998 | 0.0018 | 0.9 | 60 | 1120 |
| Example 4 | 0.05 | Cubic | 4.027 | 0.996 | 0.0013 | 0.8 | 84 | 1300 |
| Example 5 | 0.1 | Cubic | 4.020 | 0.991 | 0.0021 | 0.9 | 40 | 800 |
| Example 6 | 0.05 | Cubic | 4.028 | 0.998 | — | 0.8 | 90 | 720 |
| Comparative Example 1 | 0.17 | Cubic | 4.005 | 0.991 | 0.0021 | 1–3 | 30 | 400 |
| Comparative Example 2 | 0.1 | Cubic | 4.010 | 0.998 | 0.0020 | 1–20 | 40 | 300 |

As is apparent from Table 1, all of the ceramic pieces having a ceramic grain size of about 0.9 μm or less exhibit excellent withstand voltage as high as 720 V/mm or more. When the ceramic grain size is 1 μm or more, the specific resistance at room temperature decreases and withstand voltage decreases simultaneously. When the grain size of the raw powders is in excess of about 0.1 μm, the ceramic grain size increases to 1 μm or more to result in lowering withstand voltage. Furthermore, when the lattice constant of the raw powders is 4.02 angstrom or less, the ceramic structure becomes heterogeneous, i.e., a mixture of micrograins (1 μm grains) and coarse grains (10–20 μm), to result in lowering withstand voltage. When the raw powder is obtained by forming a solid solution from titanium, barium, and pre-doped La which serves as a semiconducting agent or by post-adding La to a barium titanate powder, withstand voltage slightly decreases in the case of the latter method. The reason for this may be considered that withstand voltage of the ceramic is affected by compositional homogeneity of grains forming the ceramic as well as ceramic grains themselves.

As described hereinabove, the barium titanate semiconductive ceramic having an average ceramic grain size of about 0.9 μm or less according to the present invention has low specific resistance at room temperature and high withstand voltage fully satisfying the demand for enhancing withstand voltage and is suitable for applications such as controlling temperature, limiting current, or heating at constant temperature. The barium titanate semiconductive ceramic enables an apparatus using the same to have enhanced performance and reduced size.

Furthermore, in the present invention, a ceramic endowed with particularly high withstand voltage is obtained by firing a barium titanate powder or a calcined barium titanate powder having strictly limited physical properties, i.e., a grain size of about 0.1 μm or less, a crystal structure of the cubic system, and a lattice constant of 4.02 angstroms or more, and containing a microquanity of a semiconducting agent forming a solid solution.

What is claimed is:

1. A barium titanate which is a fired semiconductive ceramic exhibiting a positive resistance-temperature characteristic and having an average ceramic grain size of 0.9 μm or less, a specific resistance at room temperature not exceeding 90 ohm.cm and a withstand voltage of at least 720 V/mm.

2. The barium titanate semiconductive ceramic according to claim 1, containing at least one a semiconducting agent selected from the group consisting of rare earth metal elements and transition metal elements.

3. The barium titanate semiconductive ceramic according to claim 1, containing La.

4. The barium titanate semiconductive ceramic according to claim 1 consisting essentially of barium titanate having a positive amount which is less than 0.5 mol % based on the Ti of a semiconducting agent incorporated therein so as to form a solid solution.

5. The barium titanate semiconductive ceramic according to claim 4, in which the semiconducting agent is La.

6. The barium titanate semiconductive ceramic according to claim 4, in which the average ceramic grain size is about 0.1 μm or less.

7. The barium titanate semiconductive ceramic according to claim 6, in which the barium titanate has a cubic system crystal structure.

8. The barium titanate semiconductive ceramic according to claim 7, in which the barium titanate has a lattice constant of 4.02 Angstroms or more.

9. The barium titanate semiconductive ceramic according to claim 4, in which the barium titanate has a cubic system crystal structure.

10. The barium titanate semiconductive ceramic according to claim 4, in which the barium titanate has a lattice constant of 4.02 Angstroms or more.

11. The barium titanate semiconductive ceramic according to claim 1, in which the average ceramic grain size is about 0.1 μm or less.

12. The barium titanate semiconductive ceramic according to claim 11, in which the barium titanate has a cubic system crystal structure.

13. The barium titanate semiconductive ceramic according to claim 12, in which the barium titanate has a lattice constant of 4.02 Angstroms or more.

14. The barium titanate semiconductive ceramic according to claim 1, in which the barium titanate has a cubic system crystal structure.

15. The barium titanate semiconductive ceramic according to claim 1, in which the barium titanate has a lattice constant of 4.02 Angstroms or more.

* * * * *